(12) United States Patent
Kurosawa et al.

(10) Patent No.: US 7,670,409 B2
(45) Date of Patent: Mar. 2, 2010

(54) METHOD FOR PROCESSING ORGANIC SOLVENT-CONTAINING AIR

(75) Inventors: Masaji Kurosawa, Tokyo (JP); Katsuhiro Yamashita, Tokyo (JP); Tomohiro Deguchi, Tokyo (JP)

(73) Assignee: Nichias Corporation, Tokyo (JP)

(*) Notice: Subject to any disclaimer, the term of this patent is extended or adjusted under 35 U.S.C. 154(b) by 380 days.

(21) Appl. No.: 11/678,722

(22) Filed: Feb. 26, 2007

(65) Prior Publication Data
US 2007/0209511 A1   Sep. 13, 2007

(30) Foreign Application Priority Data
Mar. 7, 2006   (JP) ............................... 2006-061003

(51) Int. Cl.
*B01D 53/06* (2006.01)
*B01D 53/86* (2006.01)
*F23G 7/07* (2006.01)

(52) U.S. Cl. ........................ 95/113; 95/141; 423/245.3

(58) Field of Classification Search .................. 95/107, 95/113, 117, 121–123, 141, 143–145, 148; 96/125; 423/210, 245.1, 245.3
See application file for complete search history.

(56) References Cited

U.S. PATENT DOCUMENTS

| | | | | |
|---|---|---|---|---|
| 4,409,006 A | * | 10/1983 | Mattia | ........................ 95/113 |
| 5,176,798 A | * | 1/1993 | Rodden | ...................... 202/159 |
| 5,312,477 A | * | 5/1994 | Minor | ............................ 95/99 |
| 5,595,586 A | * | 1/1997 | Sivavec | ....................... 95/143 |
| 5,609,829 A | | 3/1997 | Lucas et al. | |
| 5,695,546 A | * | 12/1997 | Izumi et al. | ................... 95/115 |
| 5,941,073 A | | 8/1999 | Schedler et al. | |
| 2001/0009124 A1 | * | 7/2001 | Suzuki et al. | ................. 95/113 |
| 2003/0070549 A1 | | 4/2003 | Chou | |
| 2005/0172805 A1 | * | 8/2005 | Motono et al. | ................ 95/113 |

OTHER PUBLICATIONS

U.S. Appl. No. 11/678,712, filed Feb. 26, 2007, Kurosawa, et al.

* cited by examiner

*Primary Examiner*—Frank M Lawrence
(74) *Attorney, Agent, or Firm*—Oblon, Spivak, McClelland, Maier & Neustadt, L.L.P.

(57) ABSTRACT

A method for processing an organic solvent-containing air is disclosed. The method can be operated in spite of a rapid fluctuation of the concentration of the organic solvents in the air to be processed, specifically, the method does not increase the organic solvent content in the air to be emitted into the atmosphere after processing, even if the concentration of the organic solvents rapidly changes. The method comprises carrying out simultaneously and continuously an adsorbing-removing step, a regenerating step, and a combustion step, while mixing a purified air produced in the adsorbing-removing step with an exhaust gas from a combustion furnace produced in the combustion step, and decomposing the organic solvents in the mixture by oxidation.

12 Claims, 2 Drawing Sheets

METHOD FOR PROCESSING ORGANIC SOLVENT-CONTAINING AIR

BACKGROUND OF THE INVENTION

1. Field of the Invention

The present invention relates to a method for continuously processing an organic solvent-containing air and, more particularly, to a method for processing an organic solvent-containing air comprising carrying out simultaneously and continuously a step of removing organic solvents in air to be processed by adsorbing the organic solvents in an adsorbing member containing an adsorbent such as zeolite supported thereon (adsorbing-removing step), a step of regenerating the adsorbing member which has adsorbed the organic solvents (regenerating step), and a step of burning the organic solvents in the air containing high-concentration organic solvents produced by regenerating the adsorbing member (combustion step).

2. Description of Related Art

Air containing organic solvents such as a halogenated hydrocarbon, toluene, and ethyl acetate (hereinafter referred to from time to time as "organic solvent-containing air") is discharged from processes for manufacturing liquid crystals, semiconductors, LEDs, plasma displays, resins, coating materials, and the like, as well as from facilities for printing, coating, cleaning, etc. Since such organic solvents are harmful, the organic solvents in the air discharged from these manufacturing processes, printing equipment, coating equipment, cleaning equipment, and the like must be removed by an appropriate method.

A conventional method for processing an organic solvent-containing air comprises an adsorbing-removing step of removing the organic solvents in the air by causing the air to flow through an adsorbing member, a regenerating step of regenerating the adsorbing member by causing a regeneration air to flow though the adsorbing member which has adsorbed the organic solvents, and a combustion step of feeding a concentrated air produced in the regeneration step to a combustion furnace and burning the organic solvents in the concentrated air. These steps are carried out simultaneously and continuously using an adsorption apparatus equipped with an adsorbing member containing an adsorbent such as zeolite supported thereon and a processing system for an organic solvent-containing air equipped with a combustion furnace packed with an oxidation catalyst.

A conventional method for processing an organic solvent-containing air will be described with reference to FIG. 4. FIG. 4 is a flow chart showing a conventional method for processing an organic solvent-containing air. A conventional processing system 50 for an organic solvent-containing air shown in FIG. 4 has an adsorber 41 equipped with an adsorbing member divided into an adsorption zone and a regenerating zone and a combustion furnace 42 packed with an oxidation catalyst. In the adsorber 41, an air I to be processed is caused to flow through the adsorption zone to adsorb and remove the organic solvents in the air I and, at the same time, the adsorbing member which has adsorbed the organic solvents is regenerated by causing a regeneration air J to flow through the regeneration zone. The regeneration air J used for regenerating the adsorbing member is discharged from the adsorber 41 as a concentrated air containing high-concentration organic solvents. The concentrated air is supplied to the combustion furnace 42 via a concentrated air feed pipe 47. The organic solvents in the concentrated air are burnt in the combustion furnace 42 to remove the organic solvents in the concentrated air and an exhaust gas L is discharged from the combustion furnace 42.

In this manner, in the conventional method of processing an organic solvent-containing air, a processed air K produced by processing the air I to be processed in the adsorber 41 and the exhaust gas L from the combustion furnace are discharged to the atmosphere.

Because the organic solvents burn by being catalyzed with an oxidation catalyst in the combustion furnace, an enormous heat is generated and the oxidation catalyst is exposed to a high temperature. Since a platinum catalyst, of which the upper limit of the operating temperature is 500° C., is commonly used as the oxidation catalyst, if heated above 500° C., the oxidation catalyst decreases its performance due to deterioration by heat. Therefore, it is necessary to control the temperature of the oxidation catalyst in a range not exceeding 500° C. The temperature of the oxidation catalyst is controlled by detecting the temperature of the exhaust gas from the combustion furnace and adjusting the temperature of the air supplied to the combustion furnace according to the temperature of the exhaust gas. The temperature of the air supplied to the combustion furnace is usually in a range of 250° C. to 300° C.

In this conventional method for processing organic solvents, the organic solvents can be burnt only incompletely in the combustion furnace if the concentration of the organic solvents in the air supplied to the combustion furnace is too high. That is, there is an upper limit in the concentration (content) of the organic solvents in the air which can be processed by the combustion furnace.

It is natural that the concentration of the organic solvents in the organic solvent-containing air discharged from the manufacturing processes and the like, namely, the concentration of the organic solvents in the air to be processed, fluctuates. If the concentration of the organic solvents in the air to be processed increases, the concentration of the organic solvents in the air processed in the combustion furnace also increases. When the increase in the concentration of the organic solvents in the air supplied to the combustion furnace is small, the concentration of the organic solvent can be lowered by introducing external air to reduce the concentration to level not exceeding the process limit concentration of the combustion furnace. In regard to the fluctuation of the concentration which may cause trouble in the process, an increase of the concentration is so great that the concentration of the organic solvents must be diluted by introducing a great amount of external air. However, since there is a limitation to the throughput of a combustion furnace, the amount of external air to be introduced is limited. Thus, the problem could not be obviated in some cases by introducing the external air.

In such a case, an organic solvent-containing air exceeding the process limit concentration of the combustion furnace is supplied to the combustion furnace. It is impossible for the combustion furnace alone to completely burn the organic solvent, in which case an unburned organic solvent may mix into the exhaust gas from the combustion furnace. For this reason, an exhaust gas containing an unburned organic solvent may be emitted into the atmosphere from the combustion furnace.

Accordingly, an object of the present invention is to provide a method for processing an organic solvent-containing air which can be operated in spite of a rapid fluctuation of the concentration of the organic solvents in the air to be processed, specifically, a method for processing an organic solvent-containing air which does not increase the organic solvent content in the air to be emitted into the atmosphere after processing, even if the concentration of the organic solvents rapidly changes.

SUMMARY OF THE INVENTION

As a result of extensive research in order to achieve the above object, the present inventors have found that if air processed by an adsorber and an exhaust gas from a combustion furnace after processing are mixed and the mixture is decomposed by oxidation using an oxidation-decomposition filter or the like, a stable operation can be ensured without increasing the content of the organic solvents in the purified air, even if the content of the organic solvents in the exhaust gas of the combustion furnace rapidly changes. This finding has led to the completion of the present invention.

Specifically, the invention (1) provides a method for processing an organic solvent-containing air comprising carrying out simultaneous and continuous removal of the organic solvents in the air by causing the air to flow through an adsorbing member (adsorbing-removing step), regenerating the adsorbing member by causing a regeneration air to flow though the adsorbing member which has adsorbed the organic solvents (regenerating step), and feeding an organic solvent-concentrated air produced in the regeneration step to a combustion furnace and burning the organic solvents in the concentrated air (combustion step), while mixing the purified air produced in the adsorbing-removing step with the exhaust gas from the combustion furnace produced in the combustion step, and decomposing the organic solvents in the mixture by oxidation.

The invention (2) provides a method for processing an organic solvent-containing air according to the invention (1), comprising introducing an external air into the combustion furnace and mixing with the exhaust gas of the combustion furnace and, at the same time, extracting a part of the exhaust gas from the combustion furnace, and returning the extracted gas as the regeneration air.

According to the present invention, a method for processing an organic solvent-containing air which can be operated in spite of a rapid fluctuation of the concentration of the organic solvents in the air to be processed, specifically, a method for processing an organic solvent-containing air which does not increase the organic solvent content in the air to be emitted into the atmosphere after processing, even if the concentration of the organic solvents rapidly changes, can be provided.

DETAILED DESCRIPTION OF THE INVENTION AND PREFERRED EMBODIMENTS

The invention (1) is a method for processing an organic solvent-containing air comprising carrying out simultaneous and continuous removal of the organic solvent in the air by causing the air to flow through an adsorbing member (adsorbing-removing step), regenerating the adsorbing member by causing a regeneration air to flow though the adsorbing member which has adsorbed the organic solvents (regenerating step), and feeding an organic solvent-concentrated air produced in the regeneration step to a combustion furnace and burning the organic solvents in the organic solvent-concentrated air (combustion step), while mixing the purified air produced in the adsorbing-removing step with the exhaust gas from the combustion furnace produced in the combustion step, and decomposing the organic solvent in the mixture by oxidation.

Figure 1:
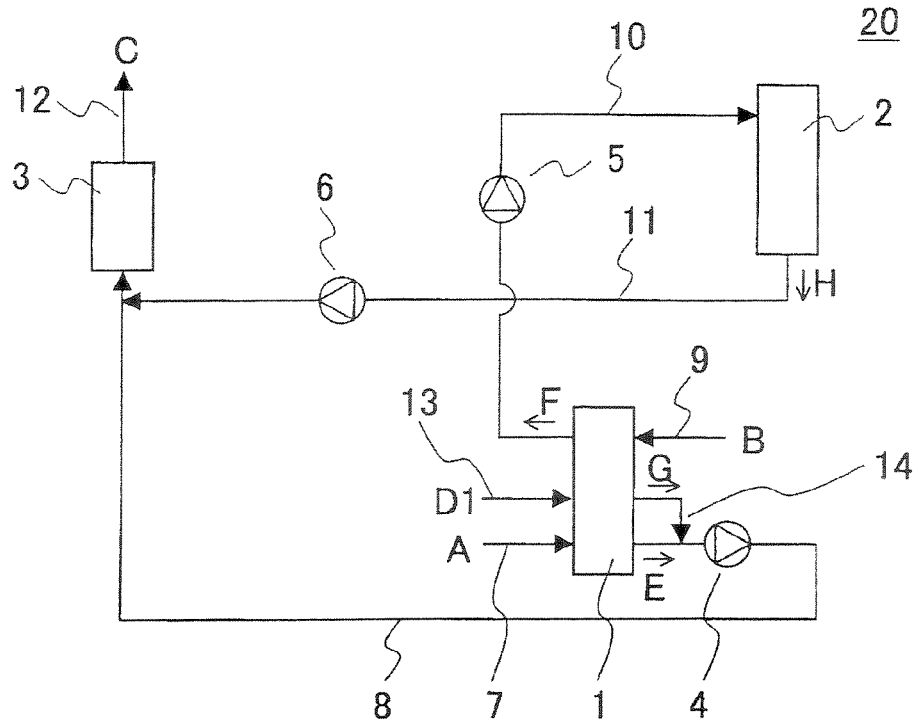
FIG. 1 is a flow chart showing an embodiment of carrying out the method for processing an organic solvent-containing air of the present invention.

The method for processing an organic solvent-containing air of the present invention will be described with reference to FIG. 1. FIG. 1 is a flow chart showing an embodiment of carrying out the method for processing an organic solvent-containing air of the present invention. In FIG. 1, an organic solvent-containing air processing system 20 has an adsorber 1, in which organic solvents in the air A to be processed are adsorbed and removed and, at the same time, an adsorbing member which has adsorbed organic solvents is regenerated, a combustion furnace 2 packed with an oxidation catalyst, an oxidation-decomposition filter 3, a pipe 7 for feeding the air A to be processed to an adsorption zone of the adsorber 1, an adsorption-treated air feed pipe 8 connecting the adsorption zone of the adsorber 1 with the oxidation-decomposition filter 3, a purging air supply pipe 13 which supplies an external air D1 to a purge zone of the adsorber 1, a purge air exhaust pipe 14 branched from the adsorption-treated air feed pipe 8 and connected to the purge zone of the adsorber 1, a regeneration air blower pipe 9 which supplies a regeneration air B to the regeneration zone of the adsorber 1, a concentrated air feed pipe 10 which connects the regeneration zone of the adsorber 1 with the combustion furnace 2, a combustion furnace exhaust gas discharge pipe 11 branched from the adsorption-treated air feed pipe 8 and connected to the combustion furnace 2, and a purified air discharge pipe 12 which sends a purified air C from the oxidation-decomposition filter 3 to the atmosphere. A first air blower 4 is installed in the adsorption-treated air feed pipe 8, a second air blower 5 is installed in the concentrated air feed pipe 10, and a third air blower 6 is installed in the combustion furnace exhaust gas discharge pipe 11.

The adsorption-removing step comprises supplying the air A to be processed to the adsorption zone of the adsorber 1 by suctioning the air using the first air blower 4 and causing the organic solvents in the air A to be processed to be adsorbed by the adsorbing member of the adsorber 1. When passing through the adsorber 1, the organic solvents are removed from the air A and the air from which the organic solvent has been removed is discharged from the adsorber 1 as an adsorption-treated air E. The adsorption-treated air is sent to the oxidation-decomposition filter 3 using the first air blower 4. The temperature of the air A when supplied to the adsorber 1 is usually from 0° C. to 50° C., and preferably from 20° C. to 30° C. The temperature of the adsorption-treated air E is usually from 20° C. to 60° C. In the organic solvent-containing air processing system 20 shown in FIG. 1, the adsorbing member of the adsorber 1 is provided with a purge zone and the external air D1 is supplied to the purge zone to cool the adsorbing member heated in the regeneration zone of the adsorber 1, and the exhaust gas G from the purge zone is sent from the purge air exhaust pipe 14 and mixed with the adsorption-treated air. However, it is optional to provide the purge zone to perform the purging operation.

The regeneration step, in which the regeneration air B is supplied to the regeneration zone of the adsorber 1 by suctioning the air using the second air blower 5 and the organic solvents adsorbed by the adsorbing member of the adsorber 1 are sent to the regeneration air, whereby the adsorbing member is regenerated, is carried out simultaneously with the adsorption-removing step. When passing through the adsorber 1, the regeneration air B receives the organic solvents from the adsorbing member and is removed from the adsorber 1 as a concentrated air F containing the organic solvent. The concentrated air F is sent to the combustion furnace 2 using the second air blower 5. The temperature of the regeneration air supplied to the adsorber 1 is usually from 120° C. to 300° C., and preferably from 180° C. to 200° C.

Next, the concentrated air F is supplied to the combustion furnace 2 and the organic solvents in the concentrated air F are burnt (the combustion step). The organic solvents in the concentrated air F are removed by burning in the combustion step. The temperature of the concentrated air F when supplied to the combustion furnace 2 is usually from 30° C. to 70° C., and the temperature of a combustion furnace exhaust gas H is usually from 300° C. to 600° C.

In the method for processing an organic solvent-containing air of the present invention, the adsorbing-removing step, regenerating step, and combustion step are simultaneously carried out, while sending the exhaust gas H produced in the combustion step from the combustion furnace to the adsorption-treated air pipe 8 by a third air blower 6 and mixing with the adsorption-treated air E to obtain a mixed gas, from which the organic solvents are removed by oxidation-decomposition using the oxidation-decomposition filter 3. The mixed air passing through the oxidation-decomposition filter 3 is the purified air C, which is sent out to the atmosphere via the purified air discharge pipe 12. The temperature of the mixed air supplied to the oxidation-decomposition filter 3 is usually in a range of 100° C. to 150° C. By mixing the combustion furnace exhaust gas with the adsorption-treated air, the temperature of the mixed air is adjusted to a prescribed temperature. In addition, the temperature of the mixed air can be controlled by mixing with external air.

In the method for processing the organic solvent-containing air of the present invention, because the combustion furnace exhaust gas is mixed with the adsorption-treated air with a small content of organic solvents, the change in the organic solvent content of the mixed air is small even if the content of organic solvents in the combustion furnace exhaust gas rapidly increases due to trouble in the process. Therefore, the content of the organic solvents in the mixed air does not exceed the processing capacity of the oxidation-decomposition filter during process trouble, enabling the oxidation-decomposition filter to appropriately deal with the trouble to avoid an increase of the organic solvent in the purified air. Accordingly, the content of organic solvents in the purified air emitted into the atmosphere, as well as fluctuation of the organic solvent content, is very small in the method for processing the organic solvent-containing air of the present invention.

Moreover, since the temperature of the mixed air to be supplied to the oxidation-decomposition filter is usually about 100° C. to 150° C., the temperature of the adsorption-treated air is usually about 30° C. to 50° C., and the temperature of the combustion furnace exhaust gas is usually about 300° C. to 600° C., the mixed air can be brought to a predetermined temperature without heating it, ensuring a high heat efficiency of the process.

In addition, since the adsorption-treated air can also be processed by the oxidation-decomposition filter, it is possible to reduce the content of the organic solvent in the purified air as compared with a conventional treating system of an organic solvent-containing air.

Figure 2:
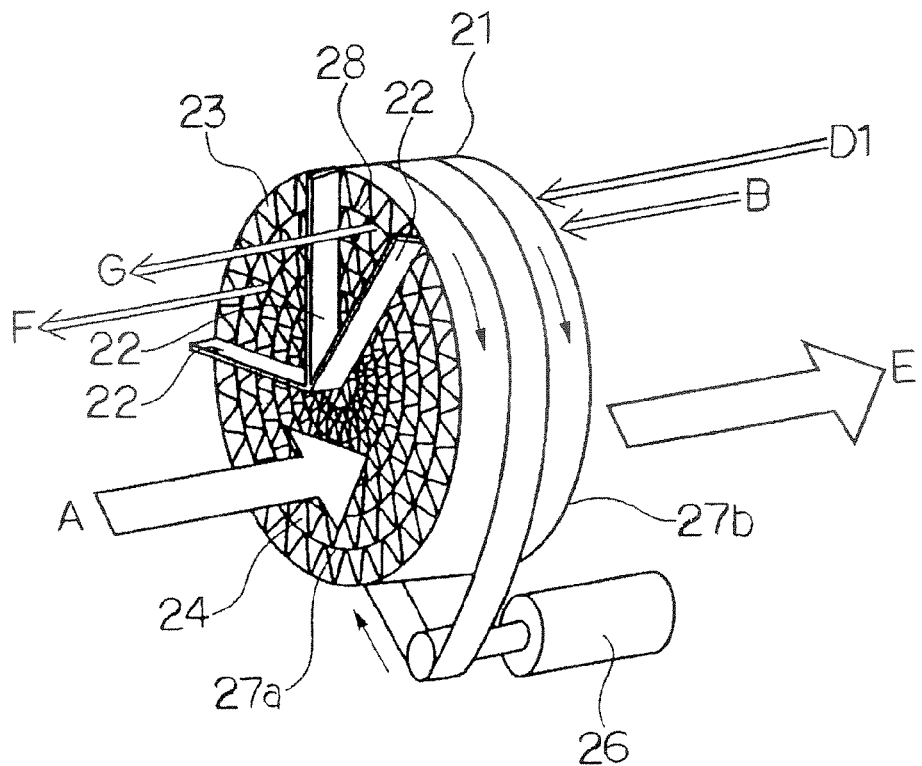
FIG. 2 is a schematic diagram showing an adsorbing member installed in an adsorber.

An adsorbing member 21 shown FIG. 2 is provided inside the adsorber 1. The adsorbing member 21 has a ventilation cave for allowing the air A to be processed, the regeneration air B, and the external air D1 for purging to flow therethrough. An adsorbent such as zeolite is supported on the adsorbing member 21. The adsorbing member 21 is divided into an adsorption zone 24, a regeneration zone 23, and a purge zone 28 by a diaphragm 22 on an opening side 27a to which the air A to be processed is supplied. An opening side 27b to which the regeneration air D1 is supplied is also divided into an adsorption zone 24, a regeneration zone 23, and a purge zone 28 by the diaphragm. The adsorbing member is attached to the adsorber 1 by a rotor shaft (not shown) in a manner that the adsorbing member can be rotated by a motor 26.

When the air A to be processed is caused to pass through the adsorption zone 24 from the opening side 27a, the organic solvents in the air A to be processed are adsorbed by an adsorbent carried on the adsorbing member 21. An adsorption-treated air E from which the organic solvents have been removed by adsorption is discharged from the opening side 27b. The adsorbent which adsorbed the organic solvents in the adsorption zone 24 is forwarded to the regeneration zone 23 by rotating the adsorbing member 21 by the motor 26. The organic solvents are moved from the adsorbent to the regeneration air B by causing heated regeneration air B to flow to the regeneration zone 23 from the opening side 27b, whereby the adsorbent is regenerated and the concentrated air F containing the organic solvents is discharged from the opening side 27a. Next, the adsorbing member 21 is rotated by the motor 26 and the regenerated adsorbent is moved to the purge zone 28 and cooled by the external air D1. Then, the cooled adsorbing member moves to the adsorption zone 24 again.

There are no specific limitations to the material used for the adsorbing member 21. For example, an adsorbing member made from a porous fiber carrier obtainable by forming woven or nonwoven fabrics of fibers such as ceramic fiber and glass fiber into a corrugated honeycomb structure on which an absorbent is supported and an adsorbing member made from a metal honeycomb carrier obtainable by forming a metal foil such as an aluminum foil into a corrugated honeycomb structure on which an absorbent is supported can be given. Examples of the adsorbent include, but are not limited to, zeolite, activated carbon, silica gel, and activated alumina.

There are no specific limitations to the oxidation catalyst packed in the combustion furnace 2. As an example, a catalyst made from a cordierite carrier on which platinum, palladium, manganese, or iron is supported can be given.

In the system 20 for processing an organic solvent-containing air shown in FIG. 1, an oxidation filter is used for oxidation-decomposition of the organic solvent in the mixed air. As an example of the oxidation filter, a catalyst comprising a carrier such as a porous ceramic (e.g. alumina, silica), carbon fiber, carbon paper, or the like and a metal catalyst such as a noble metal (e.g. platinum) or a transition metal (e.g. palladium, manganese, nickel, etc.), supported on the carrier, either individually or in combination, can be given. These examples are by no means restrictive. Other oxidation filter materials such as activated carbon, zeolite, silica gel, and activated alumina can also be given.

The ratio of the amount of the air A to be processed to the regeneration air B (air A to be processed/regeneration air B) to be supplied is preferably 3 to 15, and particularly preferably 5 to 10. The ratio of the amount of the air A to be processed to the regeneration air B (air A to be processed/ regeneration air B) to be supplied in the above range ensures the effect of the present invention of reducing the change in the organic solvent content in the purified air according to the fluctuation of the organic solvent content in the air to be processed.

Figure 3:
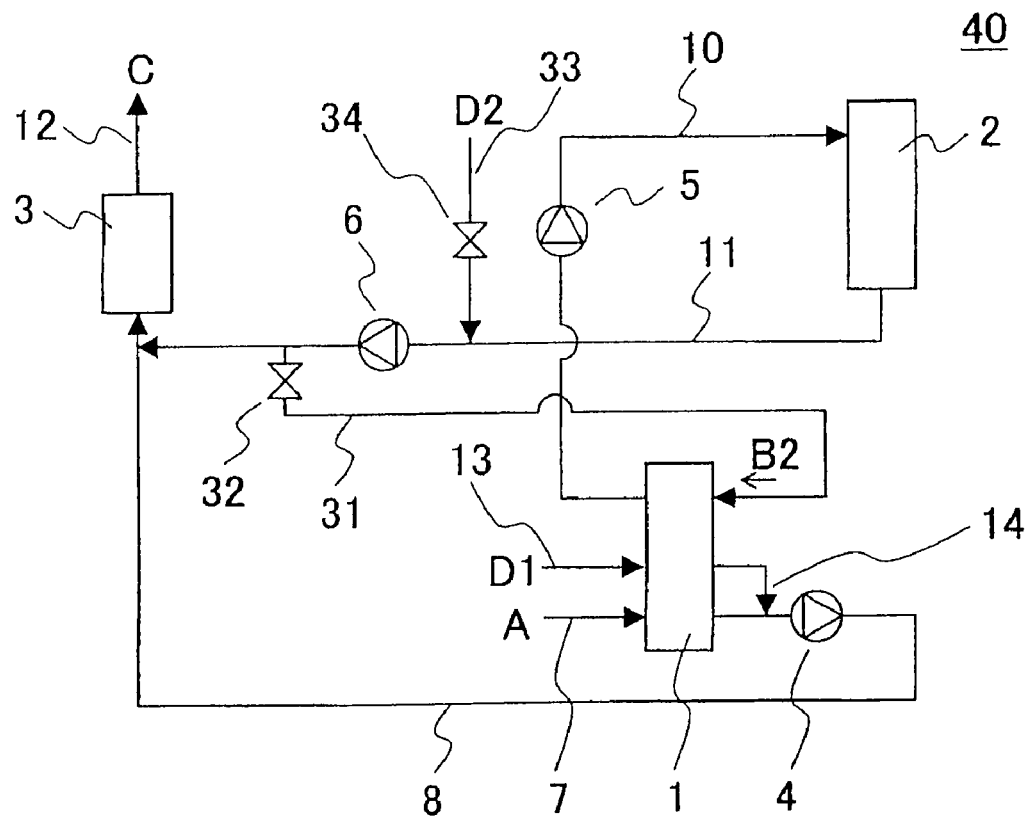
FIG. 3 is a flow chart showing an embodiment of the method for processing an organic solvent-containing air of the present invention, in which an exhaust gas from a combustion furnace is returned as a regeneration air.
Figure 4:
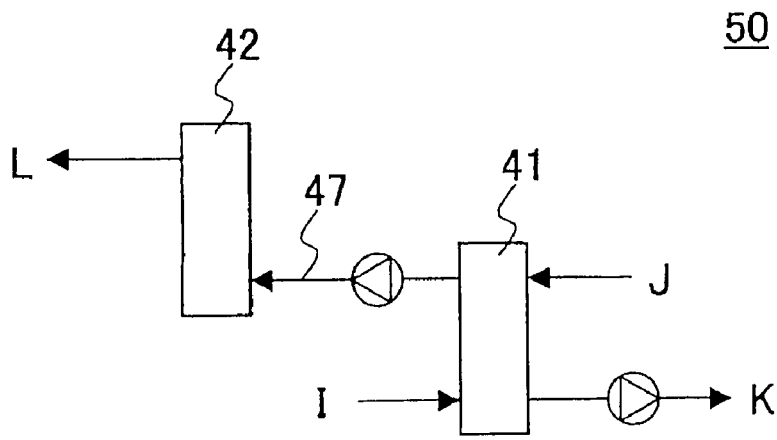
FIG. 4 is a flow chart showing a conventional method for processing an organic solvent-containing air.

In addition, in the method for processing an organic solvent-containing air according to the present invention, as shown in FIG. 3, it is possible to introduce external air into the combustion furnace exhaust gas and mix the external air with the exhaust gas from the combustion furnace and, at the same time, to extract a part of the exhaust gas from the combustion furnace, and return the extracted gas as the regeneration air. FIG. 3 is a flow chart showing an embodiment of the method for processing an organic solvent-containing air of the present invention, in which an exhaust gas from a combustion furnace is returned as a regeneration air. The organic solvent-containing air processing system 40 is the same as the organic solvent-containing air processing system 20, except that the organic solvent-containing air processing system 40 is equipped with an external air supply pipe 33 branched from the combustion furnace exhaust gas discharge pipe 11 at a point after the combustion furnace 2 and a combustion furnace exhaust gas return pipe 31 branched from the combustion furnace exhaust gas discharge pipe 11 at a point after the branched point of the external air supply pipe 33 and connected to the regeneration zone of the adsorber 1. A first valve 34 is installed in the external air supply pipe 33 and a second valve 32 is installed in the combustion furnace exhaust gas return pipe 31.

A part of the exhaust gas from the combustion furnace (hereinafter referred to from time to time as "returned combustion furnace exhaust gas B2") is extracted from the combustion furnace exhaust gas discharge pipe 11 by adjusting the second valve 32 and returned to the regeneration zone of the adsorber 1 as regeneration air, which is used in the adsorption-removing step, regeneration step, and combustion step, as well as in the oxidation-decomposition filter 3 for oxidation-decomposition of a mixed air in the oxidation-decomposition filter 3. Furthermore, concurrently with returning the combustion furnace exhaust gas, the first valve 34 is adjusted to introduce an external air D2 in approximately the same amount as the amount of the combustion furnace exhaust gas returned. The introduced external air D2 is mixed with the combustion furnace exhaust gas.

If the concentration of the organic solvents in the air to be processed rapidly increases due to process trouble or the like, the concentration of the organic solvent in the combustion furnace exhaust gas also increases. However, the concentration of the organic solvents in the combustion furnace exhaust gas in this instance, however, is small enough to the extent that there may be no problem for use as the regeneration air of the adsorbing member. The combustion furnace exhaust gas (the returned combustion furnace exhaust gas B2) can thus be used as the regeneration air.

Since the regeneration air used for regenerating the adsorbing member of the adsorber 1 is usually at a temperature of 180° C. to 300° C., external air must be heated before being supplied to the absorber 1, if used as the regeneration air. However, when the combustion furnace exhaust gas is retuned and used as the regeneration air, heating is unnecessary, because the combustion furnace exhaust gas at 300° C. to 600° C. is cooled with the external air to adjust the temperature. Therefore, returning a part of the combustion furnace exhaust gas as the regeneration air is advantageous from the viewpoint of heat efficiency.

The present invention will be described in more detail by way of examples, which should not be construed as limiting the present invention.

EXAMPLES

Example 1

An organic solvent-containing air was processed using the organic solvent-containing air processing system shown in FIG. 3 under the conditions shown in Table 1. The results are shown in Table 2.

Adsorber 1
    Carrier: A rotor-shaped honeycomb structural carrier with a diameter of 400 mm and a length in the air-flow direction of 400 mm, made from silica-alumina fiber paper (thickness: 0.2 mm, void ratio: 90%) was prepared.
    Supported adsorbent: ZSM-5 zeolite (composition: $Al_{0.64}Si_{95.36}O_{192}$)
    Ratio of adsorption zone, regeneration zone, and purge zone: 3:1:1

Combustion Furnace 2
    Packed catalyst: Cordierite-supported platinum catalyst
    Packed bed: diameter: 0.5 m×length: 1 m Oxidation-Decomposition Filter 3
    Porous ceramic-supported nickel
    Diameter: 0.5 m, thickness: 100 mm

TABLE 1

| Adsorber 1 | |
|---|---|
| Air to be processed (adsorption zone) | |
| Organic solvents contained | 1) |
| Amount of organic solvents (g/m³) | 0.0021 |
| Supplying temperature (° C.) | 30 |
| Supply amount (m³/min) | 50 |
| Returned exhaust gas B2 from combustion furnace (regeneration zone) | |
| Supplying temperature (° C.) | 180 |
| Supply amount (returned amount) (m³/min) | 5 |
| Combustion furnace 2 | |
| Concentrated air supplying temperature (° C.) | 50 |
| Concentrated air supply amount (returned amount) (m³/min) | 5 |
| Temperature of catalyst bed (° C.) | 300 |
| Oxidation-decomposition filter 3 | |
| Mixed air supplying temperature (° C.) | 100 to 150 |
| Mixed air supply amount (m³/min) | 60 |
| External air D1 (purge zone) | |
| External air D1 supplying temperature (° C.) | 30 |
| External air D1 supply amount (m³/min) | 5 |
| External air D2 (external air feed pipe 33) | |
| External air D2 supplying temperature (° C.) | 30 |
| External air D2 supply amount (m³/min) | 5 |

1)Organic solvent contained: toluene, isopropylamine, methyl ethyl ketone, and ethyl acetate

TABLE 2

| Adsorption-treated air E | |
|---|---|
| Amount of organic solvents (g/m³) | 0 |
| Temperature (° C.) | 30 |
| Returned exhaust gas B2 from combustion furnace (regenerated air) | |

TABLE 2-continued

| | |
|---|---|
| Amount of organic solvents (g/m³) | 0 |
| Temperature (° C.) | 180 |
| Concentrated air F on the outlet port side of adsorber 1 | |
| Amount of organic solvents (g/m³) | 0.176 |
| Temperature (° C.) | 50 |
| Exhaust air H on the outlet port side of combustion furnace 2 | |
| Amount of organic solvents (g/m³) | 0 |
| Temperature (° C.) | 300 to 600 |
| Purified air C (outlet port side of oxidation-decomposition filter 3) | |
| Amount of organic solvents (g/m³) | 0 |
| Temperature (° C.) | 50 |

What is claimed is:

1. A method for processing an organic solvent-containing air comprising carrying out simultaneously and continuously:
 an adsorbing-removing step comprising removing the organic solvents in the air by causing the air to flow through an adsorbing member,
 a regenerating step comprising regenerating the adsorbing member by causing a regeneration air to flow though the adsorbing member which has adsorbed the organic solvents,
 a combustion step comprising feeding an organic solvent-concentrated air produced in the regeneration step to a combustion furnace packed with an oxidation catalyst and burning the organic solvents in the concentrated air, while mixing the purified air produced in the adsorbing-removing step with the exhaust gas from the combustion furnace produced in the combustion step, and
 decomposing the organic solvents in the mixture by oxidation using an oxidation filter.

2. The method for processing an organic solvent-containing air according to claim 1, comprising introducing an external air after the combustion furnace and mixing said external air with the exhaust gas of the combustion furnace and, at the same time, extracting a part of the exhaust gas from the combustion furnace, and returning the extracted gas as the regeneration air.

3. The method for processing an organic solvent-containing air according to claim 1, wherein the oxidation catalyst comprises a cordierite carrier with platinum, palladium, manganese or iron supported thereon.

4. The method for processing an organic solvent-containing air according to claim 1, wherein the oxidation filter is selected from the group consisting of activated carbon, zeolite, silica gel, activated alumina, a catalyst comprising a porous ceramic, and carbon fiber or carbon paper carrier with a noble metal or transitional metal supported thereon.

5. The method for processing an organic solvent-containing air according to claim 1, wherein the adsorbing member comprises one or more adsorbents selected from the group consisting of zeolite, activated carbon, silica gel and activated alumina.

6. The method for processing an organic solvent-containing air according to claim 1, wherein the temperature of the air supplied to the adsorbing member in the adsorbing-removing step is from 0 to 50° C.

7. The method for processing an organic solvent-containing air according to claim 1, wherein the temperature of the air exiting the adsorbing member in the adsorbing-removing step is from 20 to 60° C.

8. The method for processing an organic solvent-containing air according to claim 1, wherein the temperature of the regeneration air supplied to the adsorbing member in the regeneration step is from 120 to 300° C.

9. The method for processing an organic solvent-containing air according to claim 1, wherein the temperature of the concentrated air supplied to the combustion furnace in the combustion step is from 30 to 70° C.

10. The method for processing an organic solvent-containing air according to claim 1, wherein the temperature of the combustion furnace exhaust gas, before mixing with the purified air produced in the adsorbing-removing step, exiting the combustion furnace is from 300 to 600° C.

11. The method for processing an organic solvent-containing air according to claim 1, wherein the temperature of the mixture of the purified air produced in the adsorbing-removing step and the exhaust gas from the combustion furnace is from 100 to 150° C.

12. The method for processing an organic solvent-containing air according to claim 1, wherein the ratio of the amount of air to be supplied to the adsorbing member to the amount of regeneration air is 3 to 15.

* * * * *